US009473892B2

(12) United States Patent
Hughes et al.

(10) Patent No.: US 9,473,892 B2
(45) Date of Patent: Oct. 18, 2016

(54) APPLIANCES THAT TRIGGER APPLICATIONS ON CONSUMER DEVICES BASED ON USER PROXIMITY TO APPLIANCE

(71) Applicant: Whirlpool Corporation, Benton Harbor, MI (US)

(72) Inventors: Richard J. Hughes, Coloma, MI (US); Peter J. Melsa, Niles, MI (US); Brandon L. Satanek, Stevensville, MI (US); Wen Shi, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 14/566,744

(22) Filed: Dec. 11, 2014

(65) Prior Publication Data

US 2016/0174035 A1 Jun. 16, 2016

(51) Int. Cl.

| | |
|---|---|
| ***H04W 4/00*** | (2009.01) |
| ***H04W 4/02*** | (2009.01) |
| ***H04W 64/00*** | (2009.01) |
| ***H04M 1/725*** | (2006.01) |
| ***H04L 12/28*** | (2006.01) |

(52) U.S. Cl.

CPC .......... *H04W 4/023* (2013.01); *H04L 12/2825* (2013.01); *H04M 1/72533* (2013.01); *H04W 4/008* (2013.01); *H04W 64/003* (2013.01)

(58) Field of Classification Search

CPC ...................... H04L 12/2825; H04L 12/2827; G08C 2201/93

USPC ..................................... 455/418–420, 456.3; 379/102.01–102.07, 207.02–207.03; 715/740; 340/12.22

See application file for complete search history.

(56) References Cited

U.S. PATENT DOCUMENTS

| | | | | |
|---|---|---|---|---|
| 8,489,112 | B2 | 7/2013 | Roeding et al. | |
| 8,694,024 | B2 | 4/2014 | Ng et al. | |
| 8,706,159 | B2 | 4/2014 | Ng et al. | |
| 8,718,620 | B2 | 5/2014 | Rosenblatt | |
| 8,938,558 | B2 * | 1/2015 | Pahud | G06F 13/102 710/14 |
| 8,942,694 | B2 * | 1/2015 | Woo | G08C 17/02 455/41.1 |
| 8,952,779 | B2 * | 2/2015 | Sugaya | G06F 9/4443 340/5.1 |
| 8,995,981 | B1 * | 3/2015 | Aginsky | G08C 17/02 455/419 |
| 9,123,234 | B2 * | 9/2015 | Jung | G08C 17/02 |
| 2005/0138077 | A1 | 6/2005 | Michael et al. | |
| 2012/0146918 | A1 * | 6/2012 | Kreiner | H04M 1/7253 345/173 |
| 2012/0178431 | A1 * | 7/2012 | Gold | H04M 1/7253 455/420 |
| 2012/0303137 | A1 * | 11/2012 | Schoeller | H04L 12/282 700/1 |
| 2013/0052946 | A1 | 2/2013 | Chatterjee et al. | |
| 2013/0214935 | A1 | 8/2013 | Kim et al. | |
| 2014/0028445 | A1 * | 1/2014 | Wild | F24C 7/082 340/10.3 |
| 2014/0070927 | A1 * | 3/2014 | Broniak | G05B 15/02 340/12.22 |

FOREIGN PATENT DOCUMENTS

| | | |
|---|---|---|
| KR | 100400459 B1 | 10/2013 |

* cited by examiner

*Primary Examiner* — Kimberly A Williams

(57) ABSTRACT

Example appliances that trigger applications on consumer devices based on user proximity to appliance background are disclosed. A disclosed example system includes an appliance to detect a proximity of a user to the appliance, a remote server to receive a result of the proximity detection from the appliance, and to send an application trigger based on the result, and a user device associated with the user to activate an application on the user device in response to the application trigger received from the remote server.

11 Claims, 10 Drawing Sheets

APPLICATION SERVER 106
100
CELLULAR NETWORK 110
INTERNET 108
WI-FI® 112
APPLIANCE 104
116
102
USER 114

APPLIANCES THAT TRIGGER APPLICATIONS ON CONSUMER DEVICES BASED ON USER PROXIMITY TO APPLIANCE

FIELD OF THE DISCLOSURE

This disclosure relates generally to appliances, and more particularly, to appliances that trigger applications on consumer devices based on user proximity to appliance background.

BACKGROUND

Conventional appliances have user interfaces that allow a user to control, operate, etc. an appliances. In some instances a user may use a mobile consumer device to control, operate, etc. an appliance.

DETAILED DESCRIPTION

Conventional appliances do not respond or adjust their behavior bashed on how close a user is to the appliance. In stark contrast to conventional appliances, the example appliances disclosed herein respond to a user based on how close the user is to the appliance. The appliance may, additionally or alternatively, utilize user identification information to determine its response. For example, when the appliance senses that the user is approaching or leaving, or a suite of appliances locates the user, its location data will be sent by the appliance to an application server implemented remotely from the appliances. The application server responds to the proximity information by triggering an application or user interface, e.g., a web browser, on a consumer user device associated with the user. In some examples, the application or user interface is trigger on another person's consumer device. For example, a parent's consumer device may be triggered when a child approaches an appliance.

As used herein the terms "remote," "remotely," or equivalents or permutations thereof mean that first and second remote function are implemented by, at, or in separate or different devices, servers, appliances, etc. separated by any distance. Remotely does not require a particular minimum separation distance. For examples, functions may be implement by different devices at the same geographic location (e.g., within a residence or place of business).

Figure 1:
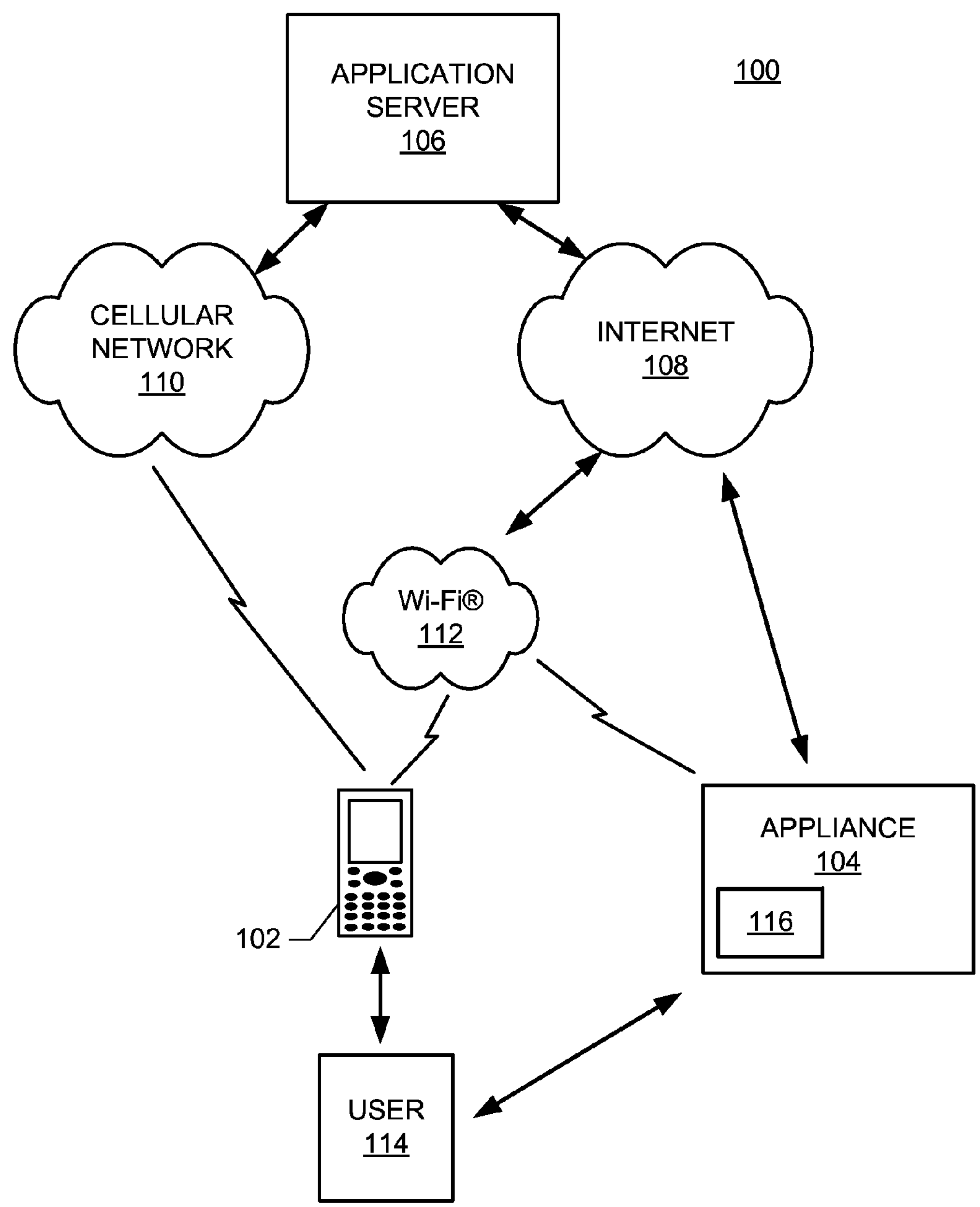
FIG. 1 is a schematic illustration of an example appliance communication system implemented in accordance with the teachings of this disclosure.

FIG. 1 is a schematic diagram of a communication system 100 having a communicatively coupled consumer device 102, appliance 104, and a remote application server 106. The consumer user device 102, the appliance 104 and the remote application service 106 are communicatively coupled via a public network, such as the Internet 108, or a cellular network 110 and/or, in some examples, a Wi-Fi® network 112. As shown, the consumer user device 102 may be communicatively coupled, simultaneously or at different times, to the remote application server 106 via the Wi-Fi network 112 and the Internet 108, and/or the cellular network 110. As also shown, the appliance 104 is communicatively coupled, simultaneously or at different times, to the application server 106 via the Wi-Fi network 112 and the Internet 108, or directly via in the Internet 108. However, it is contemplated that any number and/or type(s) of communication device(s), network(s), technology(-ies), method(s), etc. may be used to communicatively couple the consumer user device 102 and the appliance 104 to the remote application server 106. Thus, the connecting lines, or connectors shown in the various figures presented herein are intended to represent exemplary functional relationships and/or physical or logical couplings between the various elements. It should be noted that many alternative or additional functional relationships, physical connections or logical connections may be present in a practical device.

Example consumer user devices 102 include, but are not limited to, a personal computer (PC), a workstation, a residential gateway, a set-top box, a smart phone, a laptop, a netbook, a tablet PC, a game console, a server, and/or any other type of computing device containing a processor.

Example appliances 104 include, but are not limited to, a stove, a microwave, a cook top, a refrigerator, an oven, a washing machine, a dryer, a refresher, a dishwasher, or any other standalone or portable appliance, such as but not limited to, a coffee maker, a slow cooker, a toaster, a blender, a mixer, a food processor, etc.

In response to the detected proximity of a user 114 to the appliance 104, the appliance 104 sends appliance state information and user proximity information to the application server 106. As used herein, detected proximity information includes a detection of the user 114 moving toward and/or away from the appliance 104. To detect user proximity and/or identity, the example appliance 104 implements any number and/or type(s) device(s), circuit(s), algorithm(s), etc. 116 including, but not limited to near field communication (NFC), Wi-Fi, camera, infrared (IR), etc. In some examples, the appliance 104 may not implement proximity detection means, instead relying on another appliance. Additionally or alternatively, two or more appliances may cooperate and/or share data to detect proximity and/or identification information.

Figure 2:
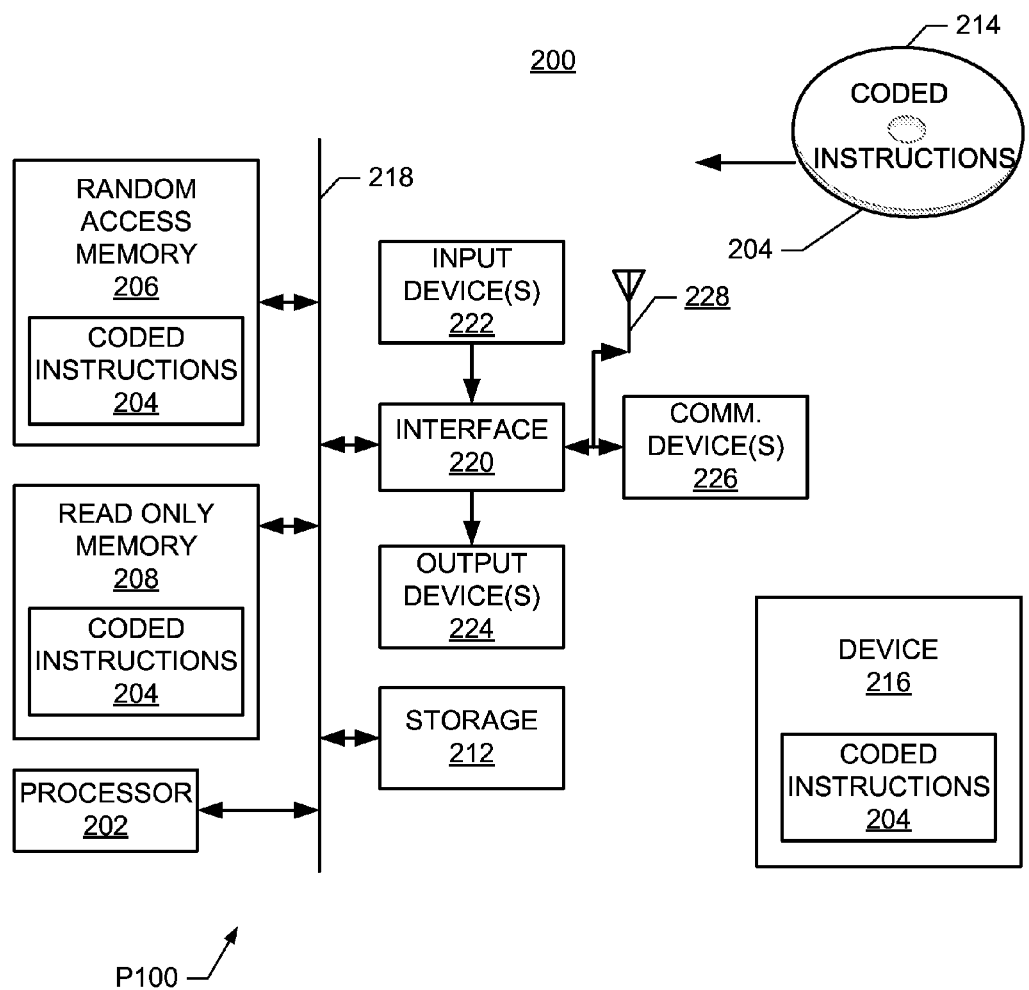
FIG. 2 is a schematic illustration of an example processor platform that may be used and/or programmed to implement the example appliance, the example mobile user device, and/or the example server of FIG. 1.

An example manner of implementing or carrying out the example consumer user device 102, the appliance 104, the example application server 106, and/or the example use cases of FIGS. 3-10 is shown in FIG. 2. The example processor platform 200 of FIG. 2 can be, for example, any type of computing device containing a processor.

The processor platform 200 of the instant example includes at least one programmable processor 202. For example, the processor 202 can be implemented by one or more Atmel®, Intel®, AMD®, and/or ARM® microprocessors. Of course, other processors from other processor families and/or manufacturers are also appropriate. The processor 202 executes coded instructions 204 present in main memory of the processor 202 (e.g., within a volatile memory 206 and/or a non-volatile memory 208), stored on a storage device 212, stored on a removable computer-readable storage medium 214 such as a CD or DVD 214, a FLASH drive 216, etc.

The processor 202 is in communication with the main memory including the non-volatile memory 208 and the volatile memory 206, and the storage devices 214, 216 via a bus 218. The volatile memory 206 may be implemented by, for example, synchronous dynamic random access memory (SDRAM), dynamic random access memory (DRAM), RAMBUS® dynamic random access memory (RDRAM) and/or any other type of RAM device(s). The non-volatile memory 208 may be implemented by, for example, flash memory(-ies), flash memory device(s) and/or any other desired type of memory device(s). Access to the memory 206 and 208 may be controlled by a memory controller.

The processor platform 200 also includes an interface circuit 220. Any type of interface standard, such as an external memory interface, serial port, general-purpose input/output, as an Ethernet interface, a universal serial bus (USB), and/or a peripheral component interface (PCI) express interface, etc, may implement the interface circuit 220.

One or more input devices 222 are connected to the interface circuit 220. The input device(s) 220 permit a user to enter data and commands into the processor 202. The input device(s) 220 can be implemented by, for example, knobs, a keyboard, a mouse, a touch screen, a track-pad, a trackball, an isopoint, proximity sensor, and/or a voice recognition system.

One or more output devices 224 are also connected to the interface circuit 220. The output devices 224 can be implemented, for example, by display devices (e.g., a display, indicators, light emitting diodes, and/or speakers.

The interface circuit 220 may also includes one or more communication device(s) 226 and/or antennae 228 such as a network interface card to facilitate exchange of data with other appliances, devices, computers, nodes and/or routers of a network.

Example use cases illustrated in the form of UML interaction diagrams that may be implemented and/or carried out by the user 114, the consumer user device 102, the appliance 104, and the remote appliance server 106 are shown in FIGS. 3-10.

Figure 3:
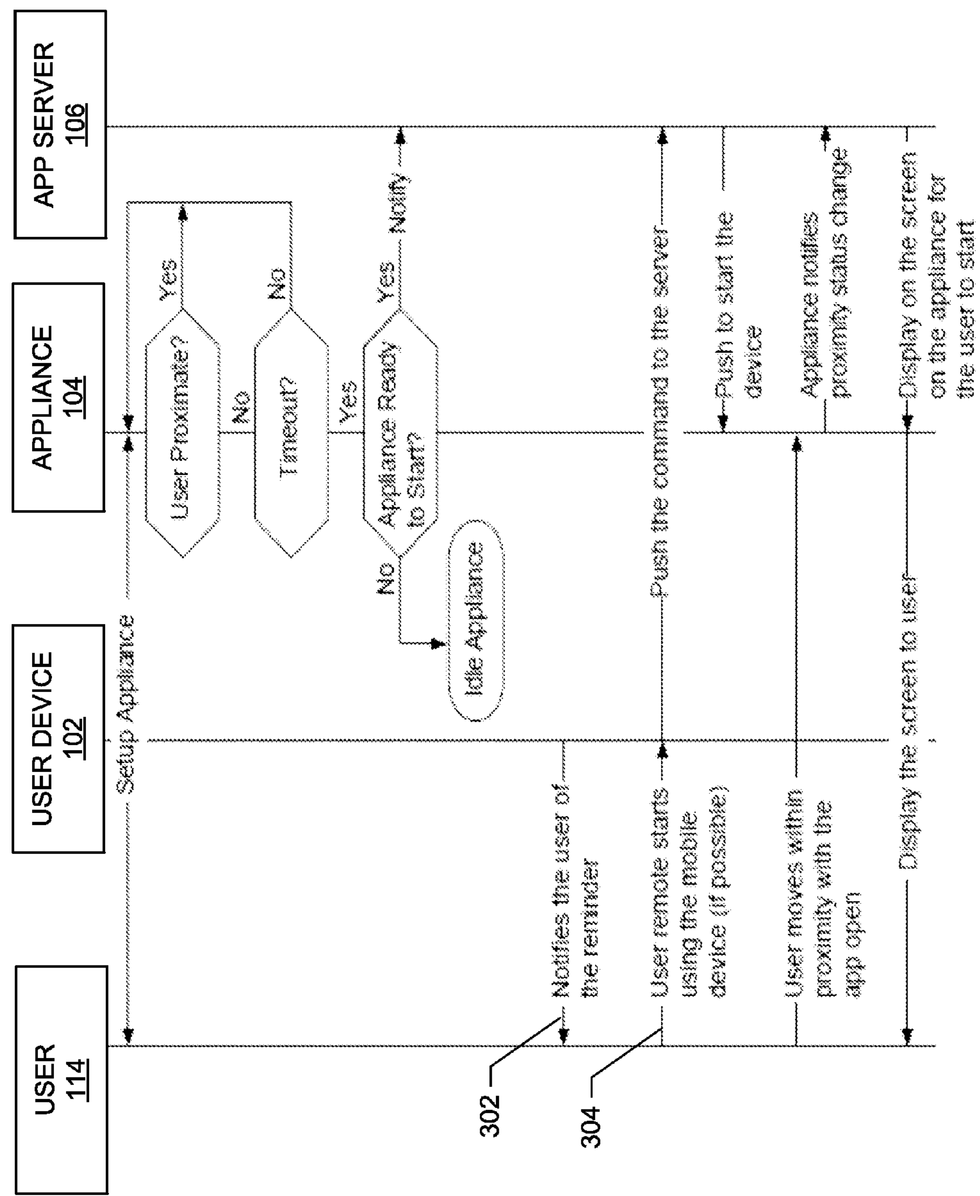
FIGS. 3-10 are example Unified Modeling Language (UML) interaction diagrams for the example system of FIG. 1.

In the example of FIG. 3, the appliance pushes a reminder 302 to the user device 102 if the user 114 walks away from the appliance 104 after configuring the appliance 104 but not starting the appliance 104. In some examples, such as that shown in FIG. 3, the user 114 is able to remotely start 204 the appliance 104.

Figure 4:
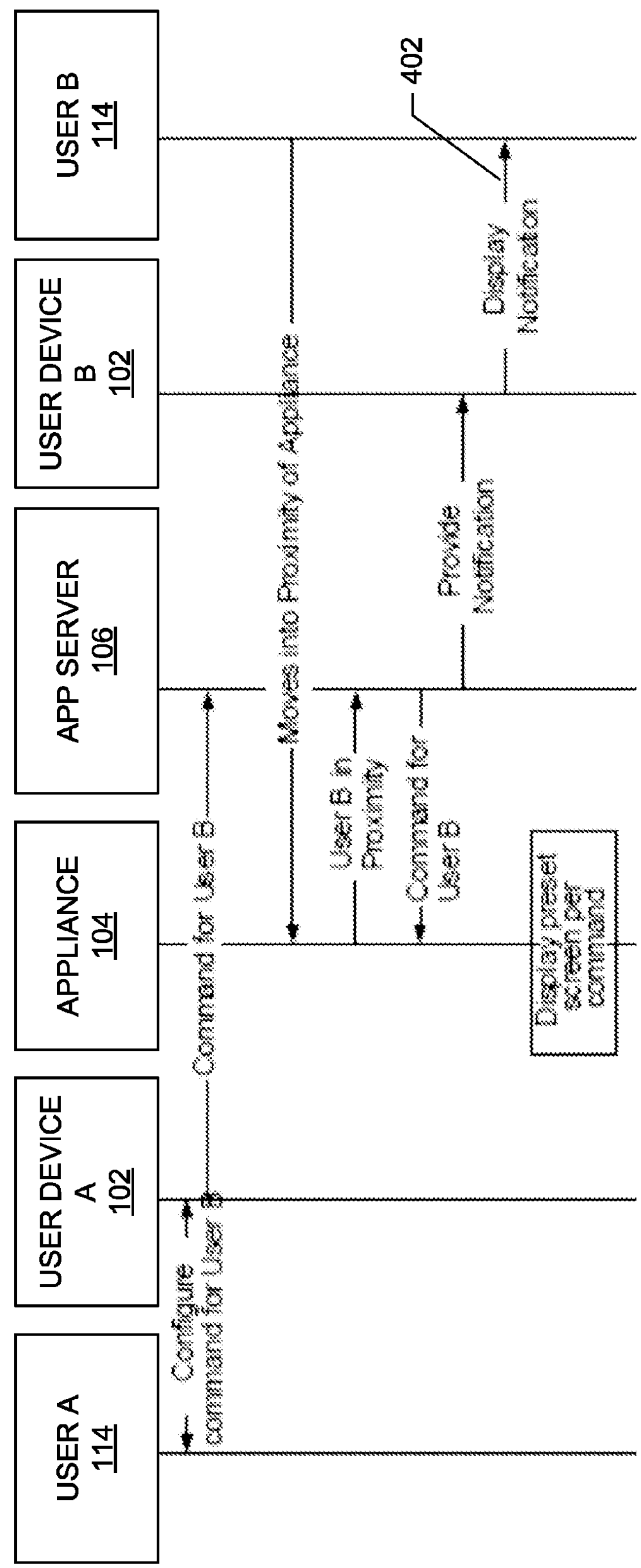

In the example of FIG. 4, a first user A 114 configures the appliance 104 such that when a second user B 114 moves into proximity of the appliance 104, a notification 402 is sent to the user device B 102 associated with the user B 114.

Figure 5:
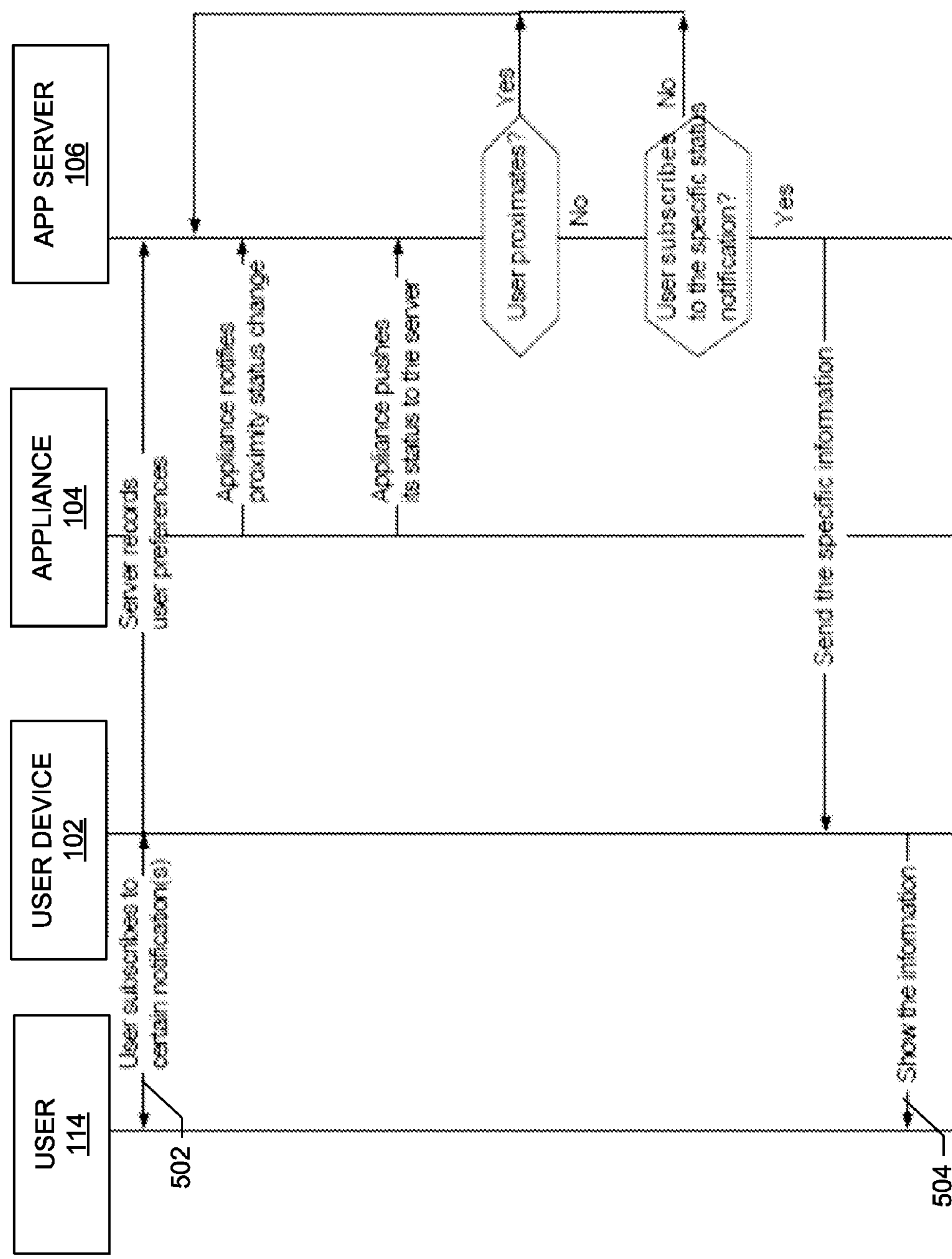

In the example of FIG. 5, notifications 502 to the user's device 102 are limited while the user 114 is in the proximity of the appliance 104, and the user device 102 receives full notifications 504 when the user 114 is not in proximity of the appliance 104.

Figure 6:
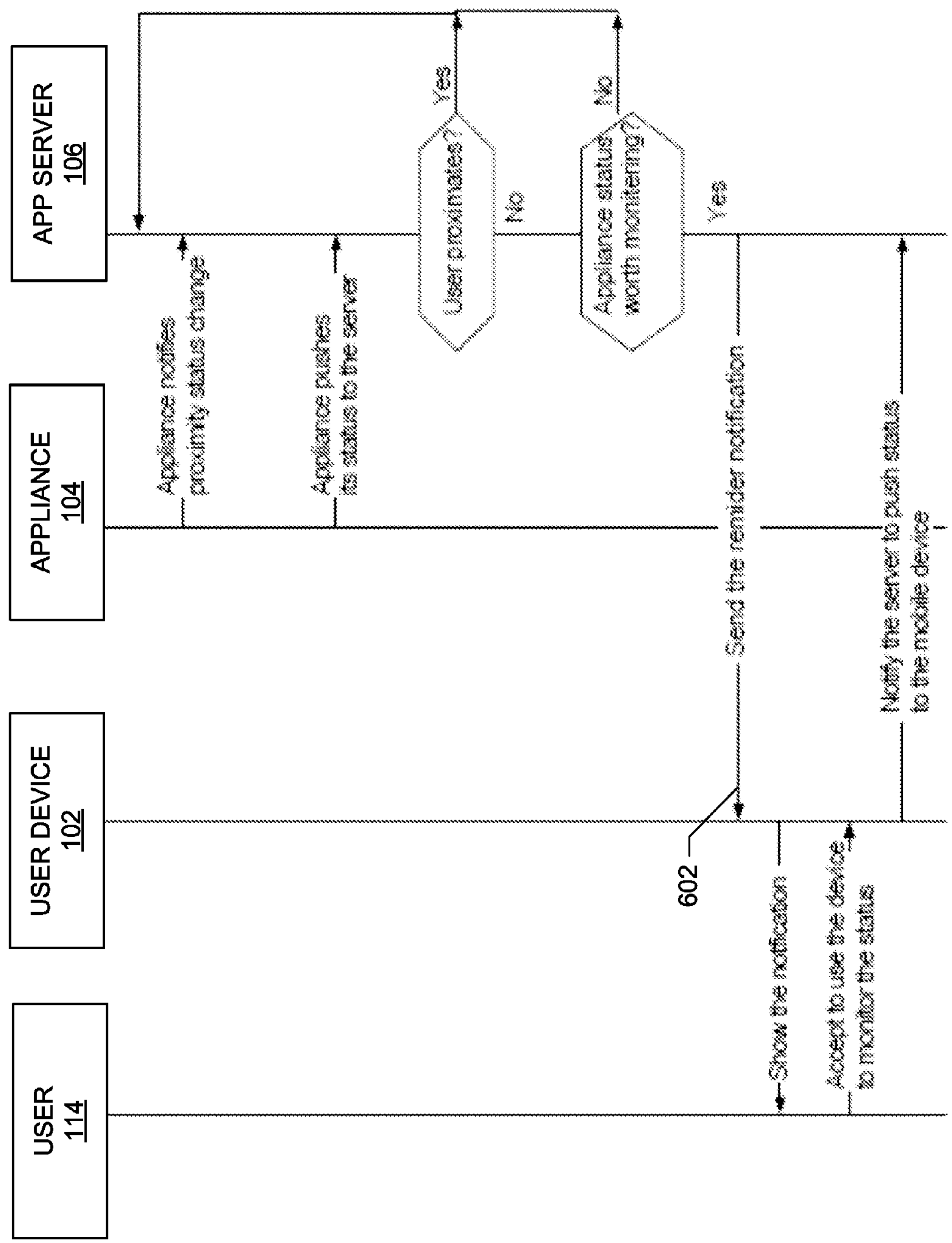

In the example of FIG. 6, when the user 114 walks out of the proximity of the appliance 104, the appliance 104 starts pushing notifications 602 to the user device 102 to remind the user 114 of the ability to use the device 102 to monitor the appliance 104 via the device 102.

Figure 7:
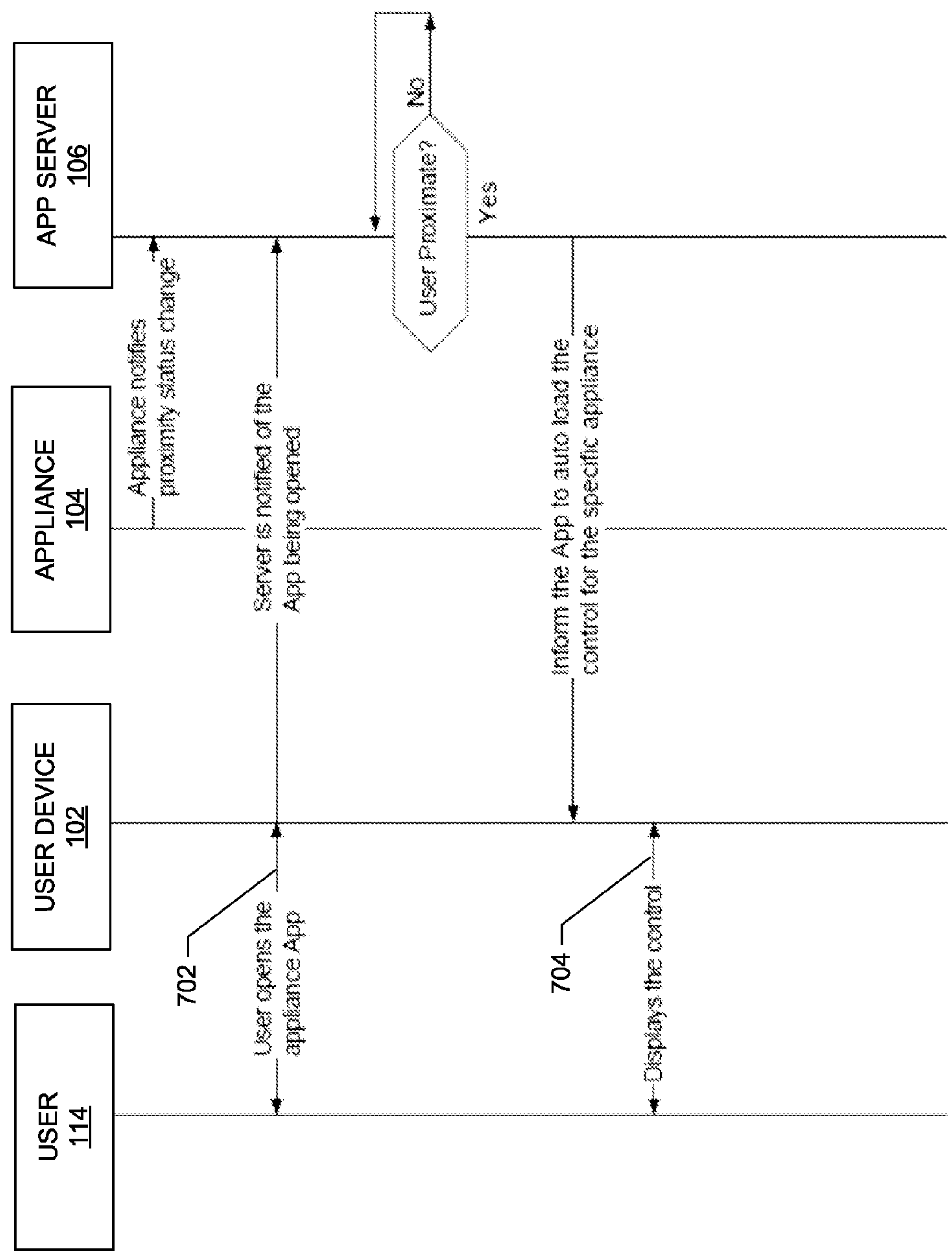

In the example of FIG. 7, when the user 114 walks within the range of the appliance 104 and pulls up 702 the monitoring application on the user device 102, the application will display controls 704 for the appliance 104 on the user device 102.

Figure 8:
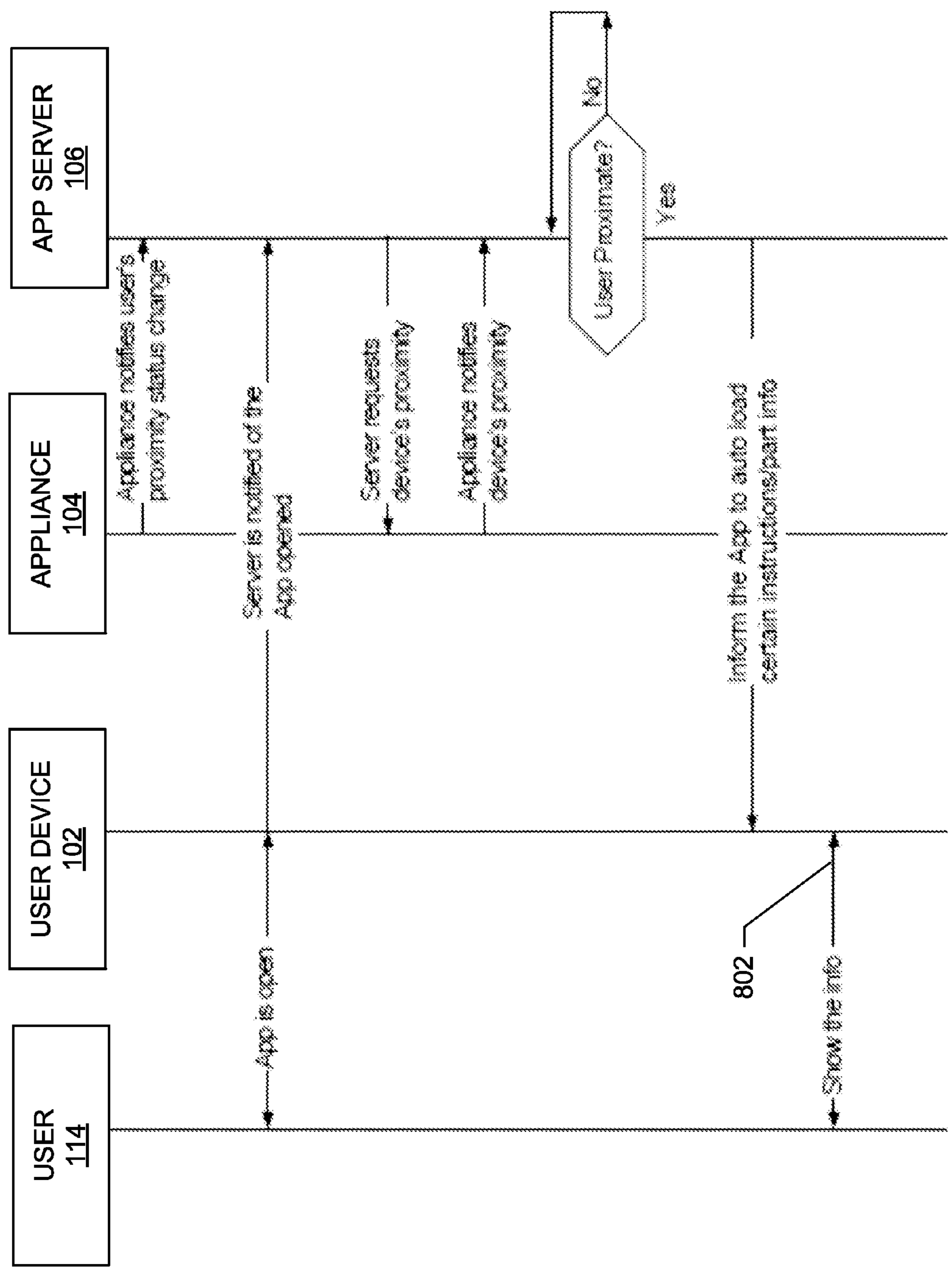

In the example of FIG. 8, the server 106 displays relevant instructions or part information 802 on the user device 102 based on the location of the user device 102 relative to the appliance 104.

Figure 9:
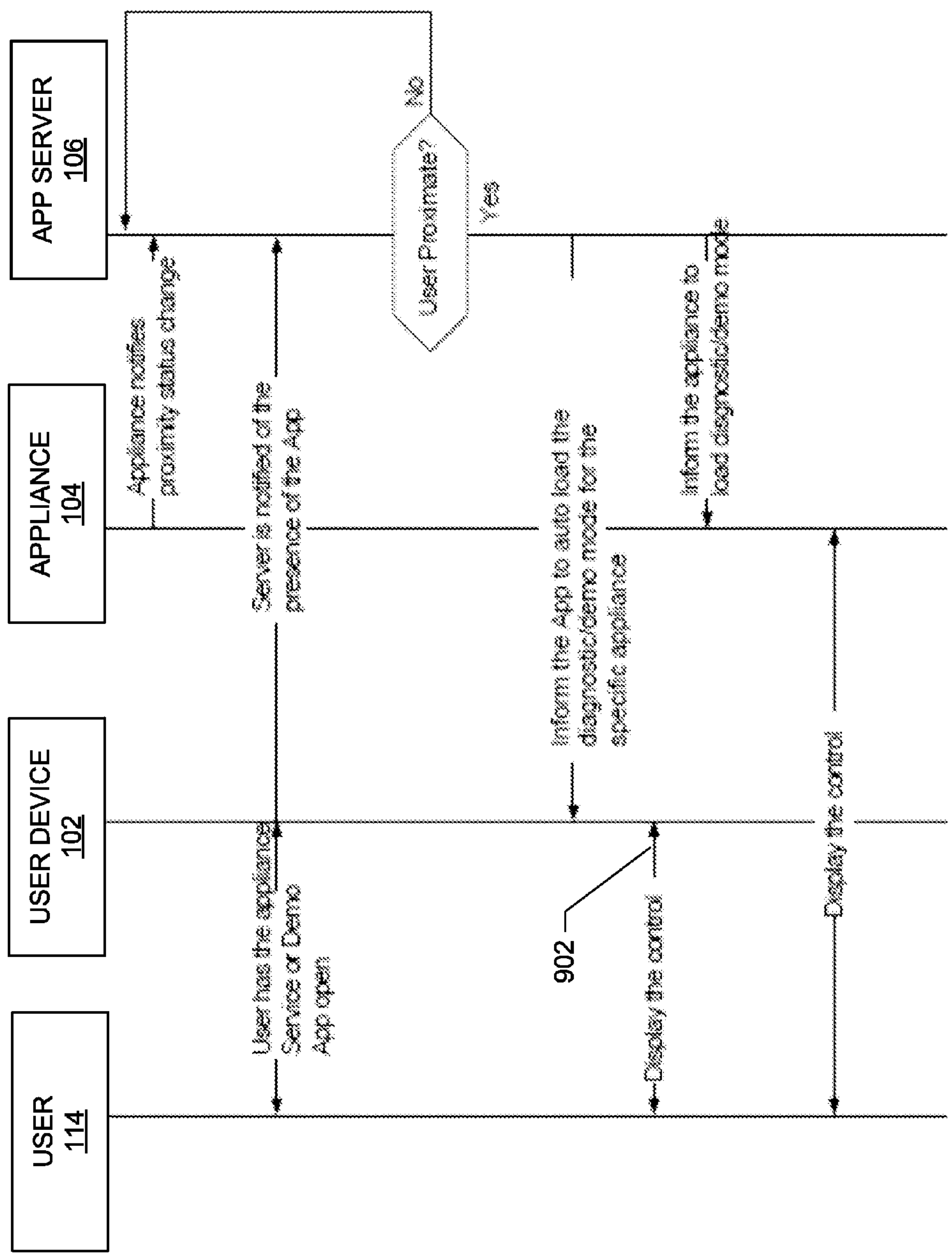

In the example of FIG. 9, the server 106 shows a diagnostic or demo mode on the user device 102 as well as on the appliance 104 when the device 102 is within a target range of the appliance 104.

Figure 10:
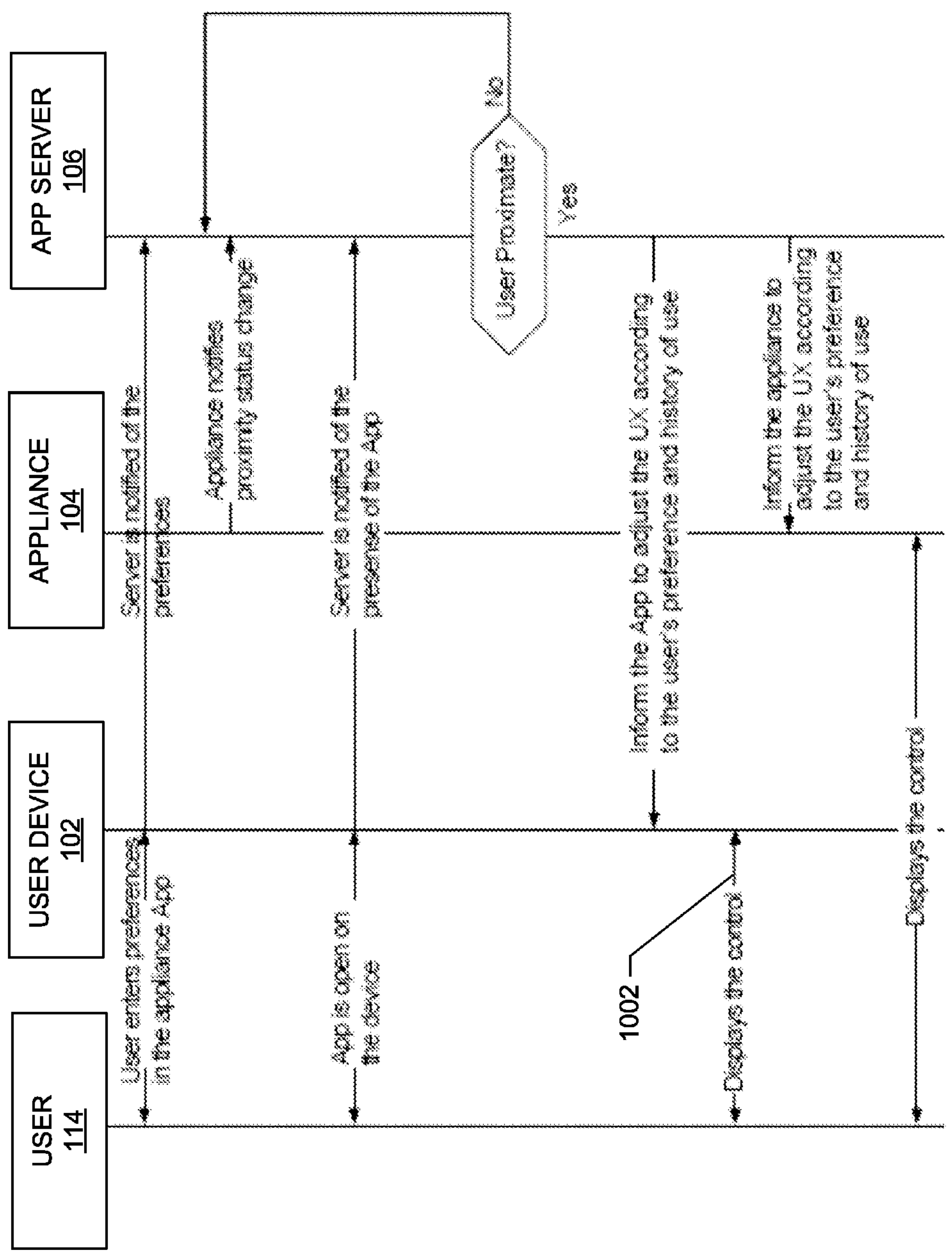

In the example of FIG. 10, when the appliance 104 identifies the user 114, and customized application 1002 (e.g., past use, built up experience, limited user, senior care, etc.), which reflects or is adapted to reflect past behavior and actions, is displayed. In this way the application 1002 can, over time, tailor itself overtime to a user's preferences.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B.

No item or component is essential to the practice of the embodiments disclosed herein unless the element is specifically described as "essential" or "critical".

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A system comprising:

an appliance configured to detect a proximity of a person to the appliance by detecting when the person moves into and out of a predetermined range of the appliance and to send appliance state information and proximity information; and a remote server communicatively coupled to the appliance to receive the appliance state information and proximity information from the appliance, and configured to send one of an application trigger or a push notification based on the appliance state information and proximity information;

wherein a user device associated with a user and communicatively coupled to the remote server will receive the one of the application trigger or the push notification and activate an application on the user device or display the push notification.

2. The system as defined in claim 1, wherein the application, if activated, displays controls for the appliance when the user moves into the predetermined range of the appliance.

3. The system as defined in claim 1, wherein the application, if activated, displays appliance use information or instructions when the user moves into the predetermined range of the appliance.

4. The system as defined in claim 1, wherein the application, if activated, displays appliance diagnostic information or demo mode when the user moves into the predetermined range of the appliance.

5. The system as defined in claim 4, wherein the user is able to start an operation remotely via the user device.

6. The system as defined in claim 1, wherein the push notification, if displayed, comprises a reminder to start an operation of the application.

7. The system as defined in claim 1, wherein the application, if activated, displays more information after the user moves out of the predetermined range of the appliance.

8. The system as defined in claim 1, wherein the application, if activated, displays a reminder that the appliance can be monitored via the application after the user moves out of the predetermined range of the appliance.

9. The system as defined in claim 1, wherein the application trigger is defined on a second user device associated with a second user.

10. The system as defined in claim 1, wherein the application displays an interface customized for the user based on past use of the appliance by the user.

11. A method comprising:

detecting in an appliance a proximity of a person to the appliance by detecting when the person moves into and out of a predetermined range of the appliance;

receiving appliance state information and proximity information at a server remote from the appliance;

sending one of an application trigger or a push notification to a user device associated with a user based on the appliance state information and proximity information; and activating an application or displaying the push notification on the user device upon receiving the one of the application trigger or the push notification from the remote server.

* * * * *